INVENTORS
John A. Maurer and
Kenneth R. Lappin
BY Frease, Bishop, Johns & Schick
ATTORNEYS

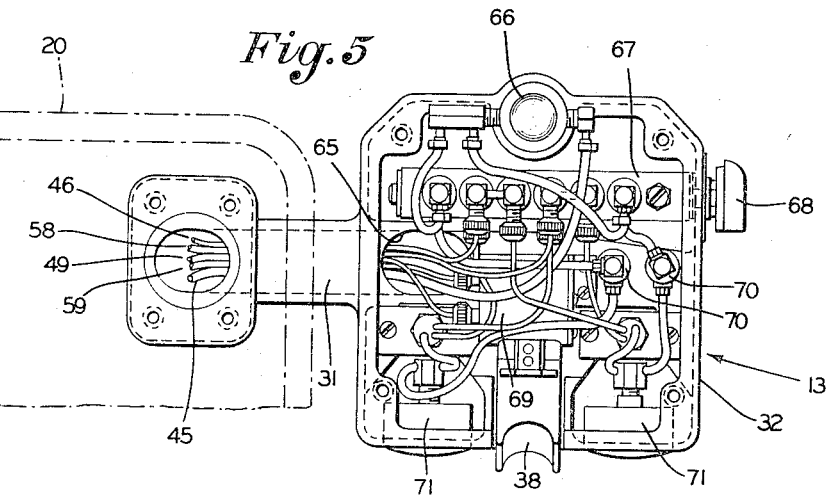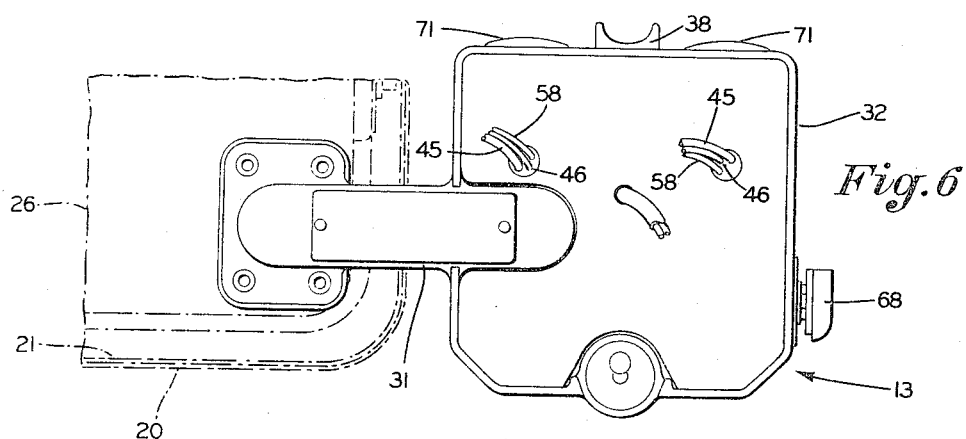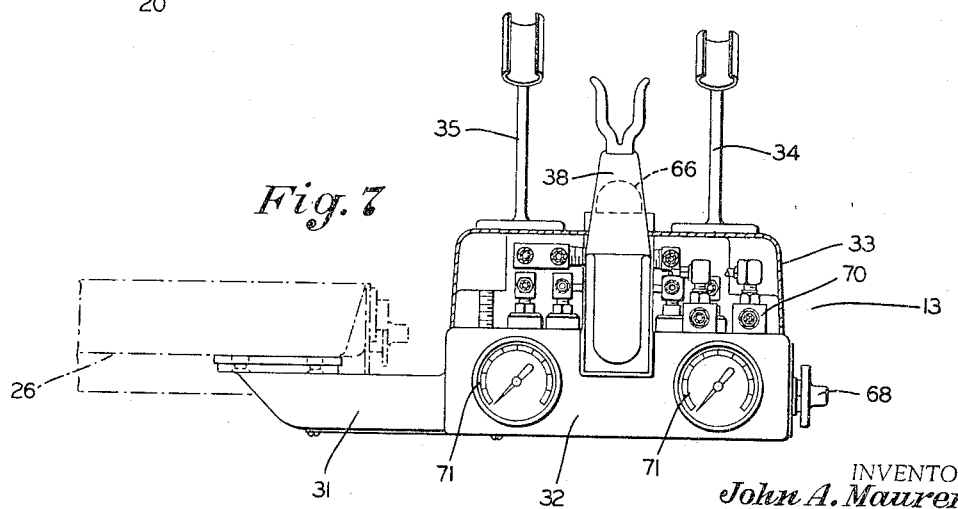

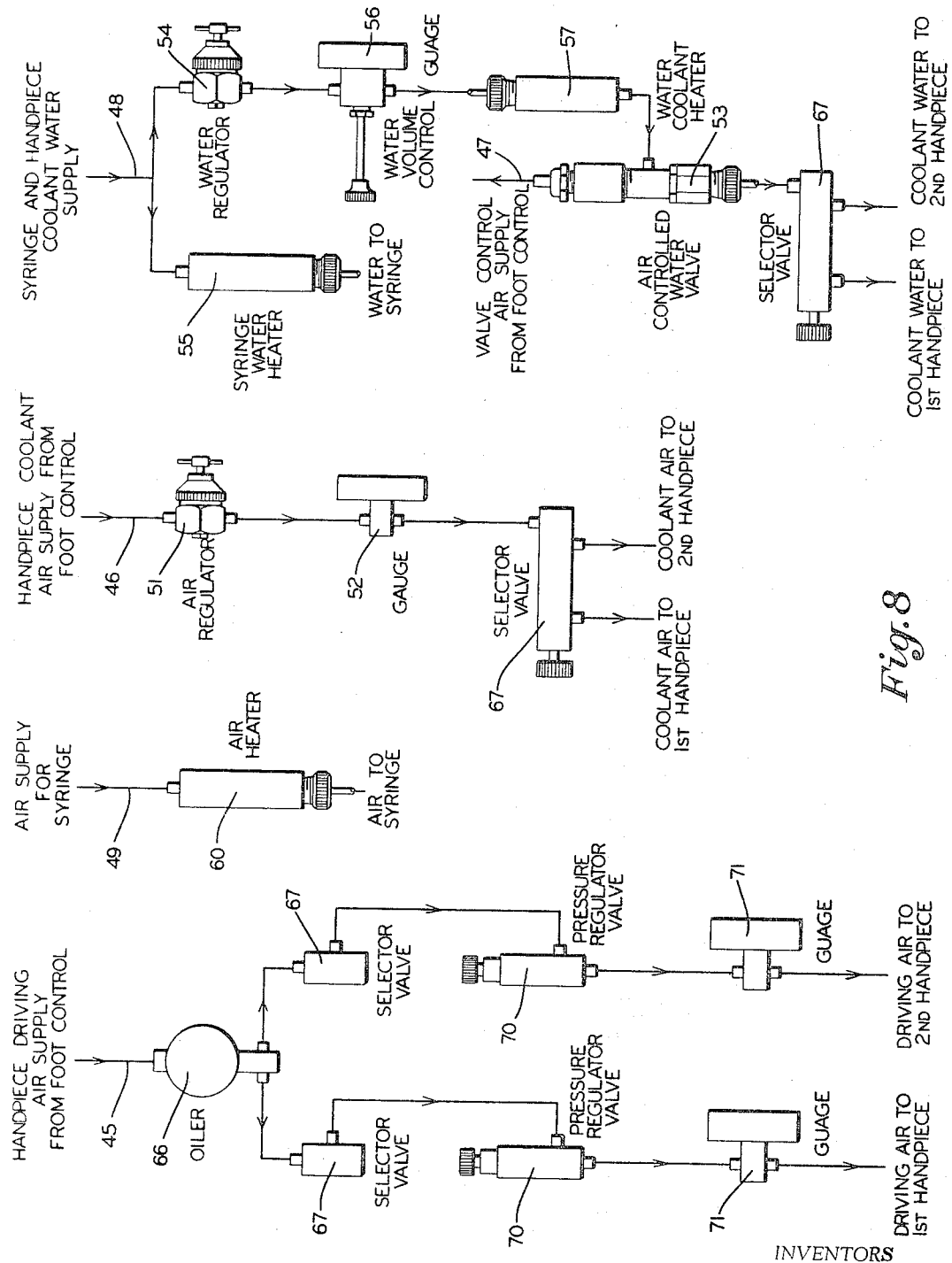

United States Patent Office 3,346,957
Patented Oct. 17, 1967

3,346,957
DENTAL INSTRUMENT UNIT CONSTRUCTION
John A. Maurer and Kenneth R. Lappin, Canton, Ohio, assignors to Weber Dental Manufacturing Company, Canton, Ohio, a corporation of Ohio
Filed Nov. 2, 1964, Ser. No. 408,155
10 Claims. (Cl. 32—22)

ABSTRACT OF THE DISCLOSURE

A dental instrument unit having tray means mounted through a pivotal tray arm on a unit base for movement of the tray means to selected horizontal and vertical positions, the tray means having a supply and regulation compartment underlying the tray, and an instrument holder means supported on and movable with the tray means.

---

Figure 1:
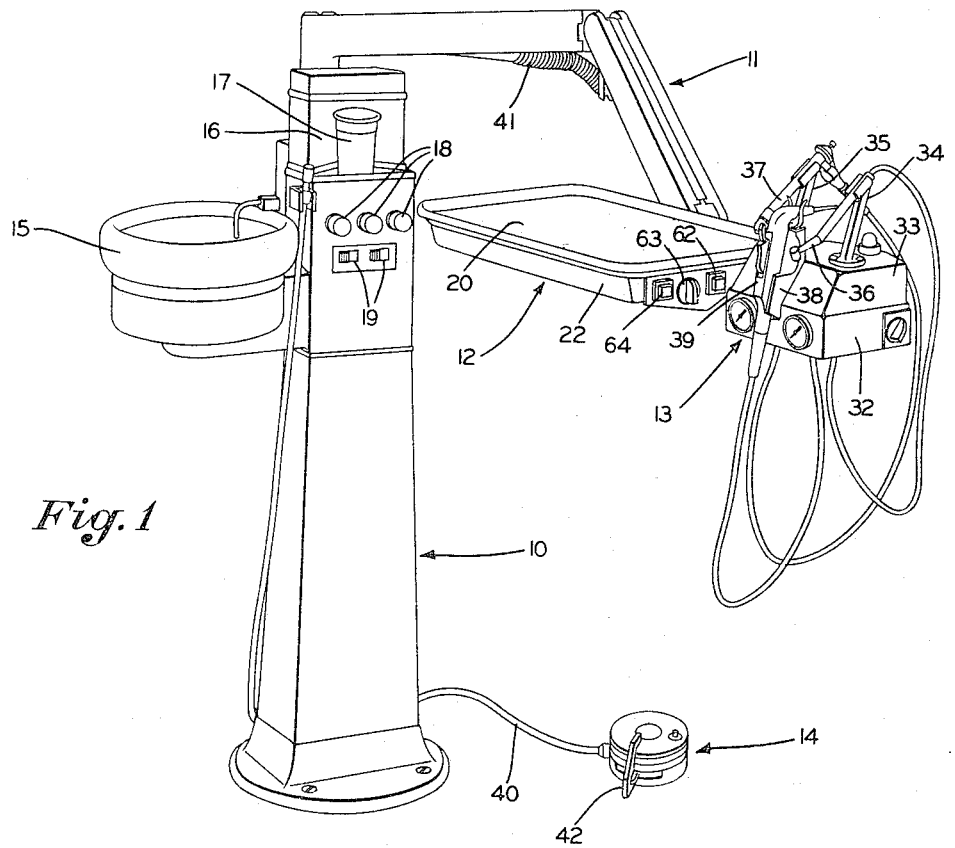

Our invention relates to improvements in dental instrument units, and more specifically to a dental instrument unit in which the dental instruments, such as handpieces and syringe, as well as the usual controls therefor, are more conveniently positioned readily accessible to the dentist in his direct working area. Even more specifically, our invention relates to a dental instrument unit of the type having a pivotally mounted tray with the dental instruments and the controls therefor being mounted directly on and movable with the tray.

Prior dental instrument units have normally included the usual cuspidor bowls, cup holder assemblies, instrument holder assemblies, and pivotal trays, each separately mounted on the unit base beside which is positioned the usual dental chair. Furthermore, the controls for these various accessories or assemblies, including the supply and regulatory controls for the dental instruments, have always been mounted directly in or closely attached to the unit base.

With the patient positioned in the dental chair adjacent the dental instrument unit, the positioning of the major portion of the accessories has been perfectly satisfactory. For instance, the cuspidor bowl is directly adjacent the patient and the cup holder assembly is directly adjacent the patient, both for convenient and ready access. Also, once the patient is positioned in the chair, the tray may be pivotally moved to a location directly in front of the patient providing the necessary working surface for and convenient to the dentist.

Due to the location of the dental instruments used by the dentist carrying out the dental work and the location of the supplies and regulatory controls therefor, it has always been necessary, however, for the dentist to reach directly over the patient for obtaining such dental instruments, as well as either reaching over the patient or moving to the back of the instrument unit for adjusting the various regulatory controls. All of this has been inconvenient for the dentist, many times interrupting his dental work, as well as being disturbing to the patient.

Certain prior attempts have been made to improve this situation by the provision of a separate pivotal arm on the instrument unit having an instrument holder at the end thereof spaced from the unit so that, not only can the tray be moved pivotally in front of the patient seated in the dental chair, but by this separate pivotal arm mounting, the instruments can likewise be moved to a position in front of the patient. With this construction, the instrument supplies and regulatory controls are still necessarily positioned in the unit base.

This improved construction has to an extent relieved certain of the problems, since, by pivoting the instrument holder arm to a position in front of the patient, the instruments are then more readily accessible by the dentist, but the supply hoses for the instruments still must extend back to the unit base. Furthermore, not only is an additional pivotal arm required mounted on and extending from the already necessarily crowded unit base, but also the dentist is still required to either reach over the patient or move behind the unit base for making adjustments in the regulatory controls.

It is, therefore, a general object of the present invention to provide an improved dental instrument unit construction which completely solves the foregoing problems in a relatively simple and efficient manner.

It is a primary object of the present invention to provide improvements in dental instrument unit construction in which the dental instrument holder for removably holding the usual working dental instruments, such as handpieces and a syringe, is mounted directly on and movable directly with the pivotally mounted tray, whereby, when the patient is positioned in the dental chair and the tray is moved pivotally to a location in front of the patient and directly accessible by the dentist, the dental instruments are likewise moved to the same conveniently accessible position without the need for added pivotal mounting arms.

It is a further object of the present invention to provide an improved dental instrument unit construction of the foregoing type in which the supplies and regulatory controls for the dental instruments are also mounted with the tray and instrument holder, thereby movable pivotally directly with the tray and instrument holder and readily accessible by the dentist without disturbing the patient and without interruping the dental work.

It is still a further object of the present invention to provide an improved dental instrument unit construction having the foregoing advantageous features in a compact, aesthetically pleasing, yet easily accessible and serviceable assembly.

Finally, it is an object of the present invention to provide an improved dental instrument unit construction satisfying all of the foregoing objects, yet which may be provided at a minimum of cost.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the improvements of the present invention may be stated as residing in a dental instrument unit of the type in which tray means is mounted through a pivotal tray arm on a unit base for selected pivotal movement of the tray arm relative to the unit base and thereby movement of the tray means to selected horizontal and vertical locations in front of a patient seated in a dental chair positioned adjacent the unit. Also, the dental instrument unit may be stated as being of the type in which dental instruments are operably and selectively removably connected to the unit for selective removal and use by the dentist in performing dental work on the patient, and may further be of the type in which remote operational control means, such as a foot control, may be operably connected to the dental instruments for selective manipulation by the dentist to selectively operate at leas certain of the dental instruments in the performance of such denal work.

More specifically, the improvements of the present invention may include a tray positioned on the tray means extending generally horizontally with the instrument holder means supported totally on and movable directly with the tray means for removably holding at least one dental instrument, and with at least one dental instrument removably positioned on the instrument holder means. Further, the improvements may include supply means connected to and movable directly with the tray means operably connected to the dental instrument for directing at least fluids to the tray means and through the tray means to the instrument holder means and the dental instrument for use in operation of the instrument, as well as regulation means operably connected to the supply means at one of the tray means and instrument holder for regulating the flow of fluid to the dental instrument.

In the case of the provision of the usual remote operational control means, such as the foot control, the supply means would be operably connected to such remote operational control means for selective control of the supply means and thereby selective control of the dental instrument. Furthermore, it is preferred that one or more of the dental instruments is a fluid-driven dental handpiece having coolant spray means thereon, and at least one dental syringe, in which case, the remote operational control means would be operably connected controlling the supply means to the dental handpiece for both the handpiece driving and coolant fluids, thereby completely controlling the operation of the dental handpiece, whereas the control of the dental syringe is normally provided directly on the body of the dental syringe.

Still according to the improvements of the present invention, it is preferred to form the tray means with a freely removable tray overlying a secured but selectively removable tray, the latter of which forms the cover over a hollow supply and regulation compartment directly formed by the tray means and within which compartment may be mounted the supply means extending therethrough to the instrument holder means, as well as at least a part of the regulation means operably connected to such supply means. Also, it is preferred to provide the instrument holder means as a hollow case secured to the tray means and extending horizontally therefrom by a tubular mounting arm opening into both the tray means compartment and holder case, with the dental instruments being connected to the supply means directly at and through the instrument holder and mounting arm, as well as preferably a part of the regulation means being mounted within such holder case.

Finally, it is preferred that the instrument holder will include two fluid-driven dental handpieces and a dental syringe removably mounted thereon with both handpieces being operated by the same driving fluid and coolant fluid supplies and with said supplies being operably connected through the foot control, extending through the supply and regulation compartment of the tray means and into the instrument holder. With such an arrangement, these single driving fluid and coolant fluid supplies from the foot control are connected to selector valve means mounted in the instrument holder, which valve means is in turn operably connected to the two dental handpieces arranged for movement to either of two positions directing the single driving fluid and coolant fluid supplies to the selected dental handpiece.

Figure 2:
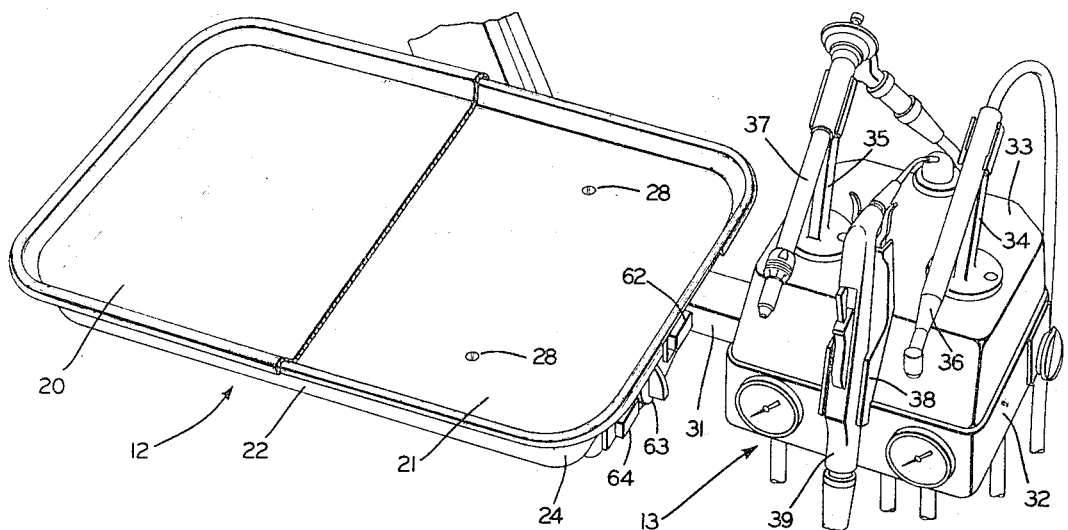
Figure 3:
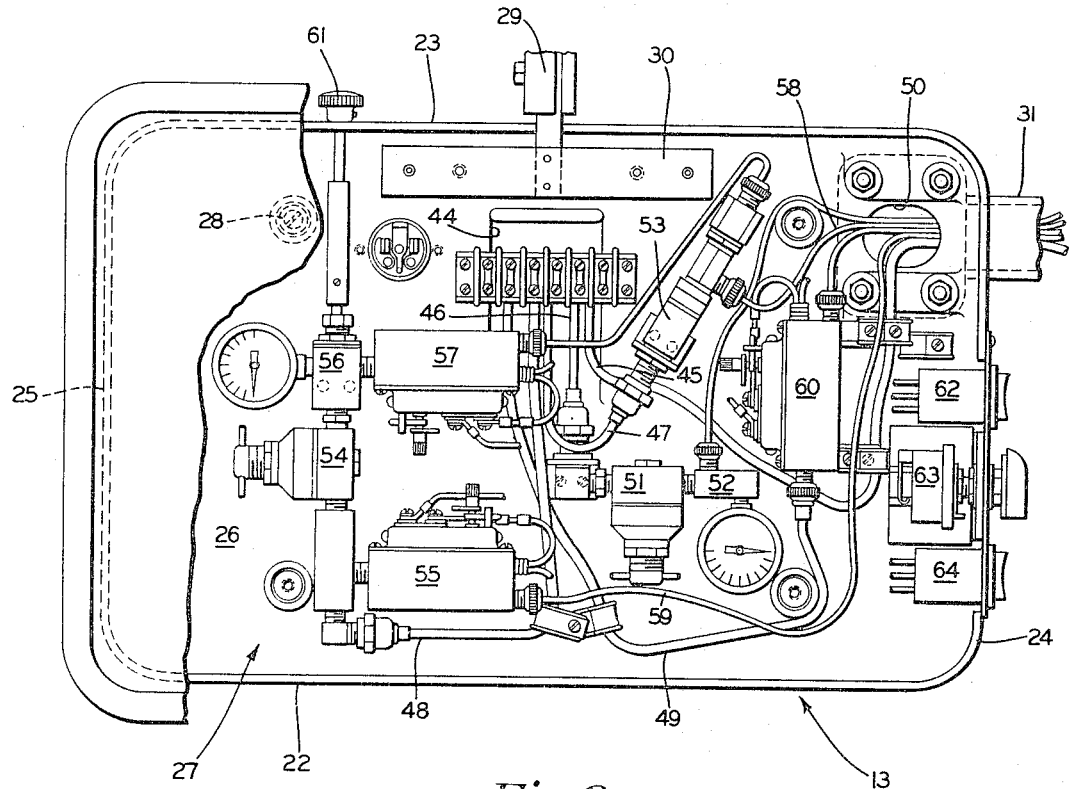
Figure 4:
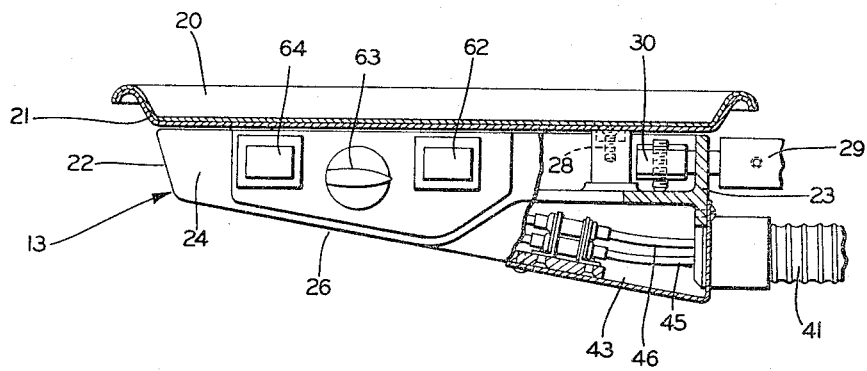

By way of example, an embodiment of the improved dental instrument unit construction incorporating the improved construction of the present invention is illustrated in the accompanying drawings forming a part hereof, wherein like numerals indicate similar parts throughout the several views, and in which:

FIG. 1 is a front perspective view of the overall dental instrument unit;

FIG. 2, an enlarged fragmentary top perspective view, with parts removed and in section, showing the improved tray and instrument holder construction incorporating the principles of the present invention;

FIG. 3, an enlarged fragmentary top plan view, with parts removed and parts broken away, showing the supply and regulation compartment of the tray construction;

FIG. 4, a fragmentary end elevation, with parts broken away and in section, of the tray construction of FIG. 3;

FIG. 5, an enlarged top plan view, with the cover removed, of the instrument holder;

FIG. 6, a bottom plan view of the instrument holder of FIG. 5;

FIG. 7, a front elevation, with a portion of the cover broken away and in section, of the instrument holder of FIG. 5; and FIG. 8, a diagrammatic flow plan of the dental handpiece driving and coolant fluid supplies, the syringe fluid supplies, and the regulatory members for such supplies, connected through and mounted in the tray supply and regulation compartment and the instrument holder.

Referring to FIG. 1, the dental instrument unit construction incorporating the improvements of the present invention includes a unit base, generally indicated at 10, a pivotal tray arm, generally indicated at 11, a tray assembly, generally indicated at 12, an instrument holder, generally indicated at 13, and a foot control, generally indicated at 14. Furthermore, the unit base 10 may have mounted thereon the usual cuspidor bowl 15, the usual recessed cup holder 16 for the cup 17, the various water valves 18 for the bowl, cup holder, and other usual accessories, and the various switches 19 for various electrical systems and controls.

More particularly according to the improvements of the present invention, and referring to FIGS. 1 through 4, the tray assembly 10 is mounted pivotal both horizotally and vertically by the tray arm 11 and includes a generally horizontally positioned, freely removable tray 20, removably supported by an underlying secured, but selectively removable, tray 21. Underlying the secured tray 21, the tray assembly is constructed with generally vertically extending front and back walls 22 and 23, and end walls 24 and 25, all integrally connected with a contoured bottom wall 26, thereby forming an instrument supply and control compartment 27. The secured tray 21 is removably fastened by a series of screws 28 received downwardly into the bottom wall 26.

As shown in FIGS. 3 and 4, the tray assembly 12 is connected to the tray arm 11 through the supporting arm 29 and leveling bar 30, which are arranged for maintaining the tray assembly 12 in a position in which the removable and secured trays 20 and 21 properly extend in a generally horizontal position regardless of the position of tray arm 11. Such supporting arm and leveling bar mechanisms are of usual construction and do not form a part of the present invention other than broadly in the general connecting function between the tray arm 11 and tray assembly 12.

The instrument holder 13 is preferably formed with a hollow case and mounted on the tray assembly 12 through a tubular mounting arm 31 secured to and opening upwardly through the tray assembly bottom wall 26. Furthermore, mounting arm 31 is formed integral with the hollow base 32 of the instrument holder 13 and opens laterally into this base.

It is preferred that this mounting connection between the tray assembly 12 and instrument holder 13 will be positioned such that the instrument holder 13 will be located adjacent an end of the tray assembly 12, preferably that end away from the patient and toward the dentist. In the embodiment shown in the drawings, this instrument holder 13 is at the right rear corner of the tray assembly, laterally outward from the tray assembly end wall 24. It should be understood, however, that this location of the instrument holder 13 is at the discretion of the particular dentist and could be varied if desired.

The hollow base 32 of the instrument holder 13 is upwardly closed by and supports a cover 33 on which cover is mounted the spaced dental handpiece holders 34 and 35 removably supporting the high speed air-driven dental handpiece 36 and low speed air-driven dental handpiece 37, respectively. A syringe holder 38 is mounted on the instrument holder cover 33 spaced between the dental handpiece holders 34 and 35 and forwardly thereof, which syringe holder removably supports a three-way dental syringe 39.

The high speed air-driven dental handpiece 36 is of the contra-angle type and is used, for instance, in high speed cutting or drilling operations, being directly air turbine driven and including both air and water coolants used as air alone or air and water mixed. The low speed air-driven dental handpiece 37 is air turbine driven by an air turbine located adjacent the rearward end thereof and connected through a short belt drive with this handpiece. Furthermore, handpiece 37 is a straight handpiece used, for instance, for lower speed-higher torque cleaning and grinding operations, but also makes use of the air and water coolants as air alone or air and water mixed. The dental syringe 39 makes use of air alone, water alone, or air and water mixed depending on the selected setting thereof.

Thus, the high and low speed air-driven dental handpieces 36 and 37 each require an oiled driving air supply, a clean coolant air supply and a coolant water supply, whereas the dental syringe 39 requires an air supply and a water supply. None of the particular dental handpieces 36 and 37 or syringe 39 are critical to the principles of the present invention other than in the general combination shown, and other handpieces or syringes could be substituted without departing from the broad principles of the present invention.

In the particular form of dental instrument unit construction illustrated and referring particularly to FIG. 1, the foot control 14 is constructed for controlling the driving air supply to each of the air-driven dental handpieces 36 and 37, as well as the air and water coolant supplies thereto. As a result, a main driving air supply line (not shown) and a main coolant air supply line (not shown) extend through a casing tube 40 from the foot control 14 to the unit base 10, as shown, and ultimately enter the flexible instrument service tube 41 secured to and running outwardly along the tray arm 11 to the tray assembly back wall 23. All of the supply lines and electrical service lines encased within the instrument service tube 41, along with this instrument service tube, are sufficiently flexible in order to permit free pivotal movement of tray arm 11 to the various desired locations of the tray assembly 12.

Again, in the particular construction illustrated, the coolant water supply for the dental handpieces 36 and 37 is controlled by the foot control 14 by means of an air line (not shown) running from the foot control through the casing 40 and ultimately outwardly to the tray assembly 12 through the instrument service tube 41, which air line controls an air actuated water valve mounted in the tray assembly 12, to be hereinafter more specifically discussed. Thus, from the foot control 14 there are the main driving air and coolant air supply lines, as well as the air control line for the water coolant valve, and the foot control 14 is arranged so that movement of the actuating lever 42 thereon in one direction will cause the flow of air through all three lines, thereby providing driving air, coolant air and coolant water at the particular dental handpiece 36 or 37 selected, whereas, movement of the foot control actuating lever 42 in the opposite direction will provide the flow of driving air and coolant air only, so that only driving air and coolant air are provided at the particular handpiece. The selection of the particular handpiece and the directing of driving air, coolant air and coolant water thereto will be discussed hereinafter more in detail.

The air and water supplies for the dental syringe 39 originate directly from the unit base 10 and are likewise provided through flexible tubing (not shown) enclosed in the instrument service tube 41. This instrument service tube 41 may additionally enclose various electrical lines from the unit base 10 as required.

Referring to FIGS. 3 and 4, the various air supply, air control, water supply, and electrical lines enter the tray assembly 12 from the instrument service tube 41 through a relatively small, downwardly angled service connection compartment 43 and then extend upwardly through the opening 44 into the supply and control compartment 27. As shown particularly in FIG. 3, the various air and water lines are the handpiece main driving air supply line 45, the handpiece main coolant air supply line 46, the handpiece coolant water air control line 47, the handpiece coolant water and syringe water supply line 48, and the syringe air supply line 49.

As before stated, the handpiece main driving and coolant air supply lines 45 and 46, as well as the handpiece coolant water air control line 47 come from the foot control 14, whereas the handpiece coolant water and syringe water supply line 48 and the syringe air supply line 49 come directly from the unit base 10.

The handpiece main driving air supply line 45 within the supply and control compartment 27 merely extends directly through the opening 50 into the instrument holder mounting arm 31.

The handpiece main coolant air supply line 46 within the supply and control compartment 27 extends into an air regulator 51, through an air pressure gauge 52, and from the air gauge is reduced in size extending through the opening 50 into the instrument holder mounting arm 31.

The handpiece coolant water air control line 47 extends within the supply and control compartment 27 to the air controlled water valve 53. This air controlled water valve 53 is of the usual air-actuated type so that when air is received through the air control line 47, this water valve is opened, admitting water therethrough, and when the air through the air control line 47 is cut off, this valve automatically closes, stopping the flow of water therethrough.

The handpiece coolant water and syringe water supply line 48 extends within the supply and control compartment 27 to both a water regulator 54 and a syringe water heater 55. From the water regulator 54, the water passes through a combination water volume control and gauge 56, through the electric water coolant heater 57, through the air controlled water valve 53 for control by such valve, and into the reduced handpiece main coolant water supply line 58, which passes through the opening 50 into the instrument holder mounting arm 31. From the syringe water heater 55, the water passes into the syringe water supply line 59 which extends to and downwardly through the opening 50 into the instrument holder mounting arm 31.

The syringe air supply line 49 within the supply and control compartment 27 extends to the electric syringe air heater 60, and from such air heater in a reduced size downwardly through the opening 50 into the instrument holder mounting arm 31.

The water volume control portion of the water volume control and gauge 56 is controlled outwardly of the supply and control compartment 27 through control knob 61, and the various handpiece and syringe heaters by the heater switch 62, while the remaining adjustments for the various components are contained within the supply and control compartment 27, requiring access thereto for adjustment.

The tray assembly 12 may also include a heater control 63 which controls a small heater in the syringe holder 38 mounted on the instrument holder 13, with such heater being of usual construction and not shown. Finally, a usual call button 64 may be provided on the tray assembly 12 wired back through the unit base 10 in the usual manner.

It should be understood that all of the various components described as being contained within or mounted on the supply and control compartment 27, as well as those to be later described within the instrument holder 13, are of usual construction and do not form a part of the present invention other than broadly in the general combination shown and other than the fact that they are located within this supply and control compartment or instrument holder.

Referring particularly to FIGS. 3, and 5 through 7, the handpiece main driving air supply line 45 passes through the instrument holder mounting arm 31, enters the instrument holder 13 through the opening 65, and is connected through the oiler 66, and is then divided into two lines each separately connected into the selector valve 67. Further, from selector valve 67, each of these lines is ultimately connected through an adjustable pressure regulator valve 70 and pressure gauge 71 to one of the high or low speed air-driven dental handpieces 36 or 37, such connection being through the bottom of the instrument holder 13.

The handpiece main coolant air supply line 46, after passing through the instrument holder mounting arm 31 and into the instrument holder 13 through the opening 65, is connected directly into the selector valve 67, where it also is split into two lines extending from this selector valve, with one ultimately passing to each of the high and low speed air-driven dental handpieces 36 and 37 through the bottom of the instrument holder 13.

The handpiece main coolant water supply line 58, after passing through the instrument holder mounting arm 31 and into the instrument holder 13 through the opening 65, also passes directly to the selector valve 67, where it likewise is split into two lines, one each of which passes from the selector valve ultimately to each of the high and low speed air-driven dental handpieces 36 and 37 through the bottom of the instrument holder 13.

Selector valve 67 is arranged such that by selectively moving the control knob 68 between two positions, the main driving air supply, main coolant air supply and main coolant water supply may be diverted to either of the high or low speed air-driven dental handpieces 36 or 37, as desired. Furthermore, when this driving air and coolant air and water is diverted to a particular handpiece, movement of the actuating lever 42 on the foot control 14 will cause driving air to be supplied to that particular handpiece, as well as both coolant air and water or coolant air alone, depending on the particular direction the foot control actuating lever 42 is moved, as hereinbefore described.

The syringe air supply line 49, after passing through the instrument holder mounting arm 31 and into the instrument holder 13 through the opening 65, passes through the connector 69 and ultimately to the dental syringe 39, with the syringe water supply line 59 following the same path to the dental syringe 39. As hereinbefore described, the dental syringe 39 may be adjusted to direct air alone, water alone, or mixed air and water spray, as desired, merely by selective adjustment of means provided thereon. Furthermore, the flow of fluids therethrough is controlled in the usual manner diretly at the dental syringe 39.

A flow plan for the air and water into the tray assembly 12, through the various components in the tray assembly and the instrument holder 13, and ultimately to the high and low speed air-driven dental handpieces 36 and 37 and the dental syringe 39 is shown in FIG. 8 in simplified form, in order that the flow of such fluids may be more clearly understood.

Referring to FIG. 8, and first considering the flow of air and water to the high and low speed air-driven dental handpieces 36 and 37, at the left of FIG. 8 is shown the flow plan for the handpiece main driving air supply from the foot control 14, through the various components and ultimately to one or the other of handpieces 36 or 37. Furthermore, in this particular flow plan, as well as the others illustrated in FIG. 8, the same numbering for the supply line and components is used as in FIG. 3 which actually shows the tray assembly 12 and in FIG. 5 which actually shows the instrument holder 13.

Referring to the left-hand side of FIG. 8, the main driving air supply for the high and low speed air-driven dental handpieces 36 and 37 is received from the control 14, as previously described, through the handpiece main driving air supply line 45, through the oiler 66, and there being split into two lines connected into the selector valve 67. From selector valve 67, the driving air supply from the two lines is directed through the pressure regulator valves 70, through the pressure gauges 71, and ultimately to the high and low spjeed dental handpieces 36 and 37.

As previously described, which of the high or low speed dental handpieces 36 or 37 will receive driving air is dependent on the setting of the selector valve 67. Furthermore, it will be noted that this driving air, since it has passed through the oiler 66, contains an oil mixture for lubricating the air turbine assembly of the particular handpiece during the driving thereof.

Referring to slightly right of center of FIG. 8, the flow plan of the handpiece coolant air supply is illustrated. Again, this coolant air supply is received from the foot control 14, when the foot control is actuated as previously described, and is directed through the handpiece main coolant air supply line 46, through the air regulator 51, through the air pressure gauge 52, and into the selector valve 67, where this coolant air supply is split into two lines for direction to the high and low speed air-driven dental handpieces 36 and 37, the particular handpiece receiving such coolant air being dependent on the particular setting of the selector valve 67.

In view of the fact that this coolant air is actually directed into the patient's mouth during the performance of dental work by the dentist, this coolant air supply cannot contain oil. It is for this reason that the driving air supply and the coolant air supply must be separate.

The flow of the coolant water supply for the high and low speed air-driven dental handpieces 36 and 37 is illustrated in the flow plan of the right-hand side of FIG. 8. As previously described, this coolant water supply is not received from the foot control 14, but rather is received direct as a main supply for both the coolant water in the handpieces and the water for the syringe, with the flow of coolant water to the handpieces being controlled by the air controlled water valve 53 by a controlling air supply from foot control 14.

Thus, the water supply, a part of which will form the coolant water for the dental handpieces 36 and 37 is received through the handpiece coolant water and syringe water supply line 48 directly to the tray assembly 12 where part of this water supply is directed through the water regulator 54, the water volume control and gauge 56, the water coolant heater 57, through the air controlled water valve 53, and into the selector valve 67 for direction to either of the high or low speed air-driven dental handpieces 36 or 37. The actual flow of this coolant water is controlled by the foot control 14 through the handpiece coolant water air control line 47, with the flow of air through line 47 opening the air controlled water valve 53, again as previously described.

Thus, by setting the selector valve 67 for the actuation of either of the high or low speed air-driven dental handpieces 36 or 37, actuation of the foot control 14 will provide oiled driving air, clean coolant air alone or coolant air and water at the particular handpiece selected.

Again, referring to the flow plan at the right-hand side of FIG. 8, the water for the dental syringe 39 is also received through the handpiece coolant water and syringe water supply line 48 and is directed through the syringe water heater 55, and then to the dental syringe 39. The flow plan for the syringe air supply is slightly to the left of center of FIG. 8 and, as shown, a clean air supply is received through the syringe air supply line 49, through the syringe air heater 60, and is directed to the dental syringe 39. As previously discussed, both the flow of fluids from the syringe 39, as well as the choice of air alone, water alone, or air and water mixed, is controlled directly at the syringe itself.

Thus according to the principles of the present invention, an improved dental instrument unit construction is provided in which the instrument holder 13 for removably holding the usual working dental instruments, such as the high and low speed air-driven dental handpieces 36 and 37 and the dental syringe 39, is mounted directly on and movable directly with the pivotally mounted tray assembly 12, whereby, when the patient is positioned in a dental chair and the tray assembly 12, including the removable tray 20, is moved pivotally on the tray arm 11 to a location in front of the patient and directly accessible by the dentist, the dental handpieces 36 and 37 and the dental syringe 39 are likewise moved to the same conveniently accessible position, without the need for added pivotal mounting arms.

Furthermore, with the hereinbefore described improved dental instrument unit construction, the fluid supplies and regulatory controls for the dental handpieces 36 and 37 and dental syringe 39 are also mounted with the tray assembly 12 and instrument holder 13, preferably directly therein and directly therethrough, so that these supplies and regulatory controls are likewise movable pivotally directly with the tray assembly and instrument holder, and are readily accessible by the dentist without disturbing the patient and without interrupting the dental work.

Finally, according to the improved dental instrument unit construction hereinbefore described, all of those advantageous features may be provided by means such as the supply and control compartment 27 in the tray assembly 12, as well as the hollow instrument holder 13, and thusly in such a manner so as to present a compact, aesthetically pleasing, yet easily accessible and serviceable assembly.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

We claim:

1. Dental instrument unit construction of the type in which tray means is mounted through a pivotal tray arm on a unit base for selected pivotal movement of the tray arm relative to the unit base and thereby movement of the tray means to selected horizontal and vertical locations, and in which dental instruments are operably and selectively removably connected to the unit for selective removal and use by the dentist in performing dental work on a patient positioned adjacent the unit base; the improvements which include a tray positioned on the tray means extending generally horizontally, instrument holder means supported totally on and movable directly with the tray means for removably holding at least one dental instrument, at least one dental instrument removably positioned on the instrument holder means, wall members formed on the tray means positioned underlying the tray and forming an instrument supply and regulation compartment underlying said tray, supply means extending through the supply and regulation compartment of the tray means and movable directly with the tray means and operably connected to the dental instrument for directing at least fluids to the supply and regulation compartment and through said compartment to the instrument holder means and said dental instrument for use in operation of said instrument, and regulation means at least partially in the supply and regulation compartment of the tray means operable connected to the supply means for regulating the flow of fluid to said dental instrument; whereby, the dental instrument when not in use, as well as the fluid regulation means therefor, are always conveniently positioned at and movable directly with the tray means readily accessible by the dentist.

2. Dental instrument unit construction as defined in claim 1 in which the instrument holder means is supported on the tray means extending generally horizontally from said tray means; in which the supply means also extends through the instrument holder means and is operably connected from said instrument holder means to the dental instrument; and in which the regulation means is also partially in the instrument holder means.

3. Dental instrument unit construction as defined in claim 1 in which the tray is freely removably positioned on the tray means; in which a second tray is positioned overlying the supply and regulation compartment and underlying and supporting said removable tray; and in which the second tray is selectively removably secured to the tray means forming a cover over the supply and regulation compartment.

4. Dental instrument unit construction as defined in claim 1 in which the instrument holder means is supported on the tray means extending generally horizontally from said tray means; in which at least two fluid-driven dental handpieces are removably positioned on the instrument holder means; in which the supply means includes a common driving fluid supply extending through the supply and regulation compartment of the tray means and into the instrument holder means, and a common coolant fluid supply means extending through the supply and regulation compartment of the tray means into the instrument holder means; in which selector valve means is mounted in the instrument holder means operably connected to the common driving fluid supply means and the common coolant fluid supply means and operably connected to the two dental handpieces movable to a position directing the driving fluid and coolant fluid supply means to one of the dental handpieces and to another position directing the driving fluid and coolant fluid supply means to the other of the dental handpieces.

5. Dental instrument unit construction as defined in claim 1 in which the instrument holder means is supported on the tray means extending generally horizontally from said tray means; in which two dental handpieces and a dental syringe are each removably positioned on the instrument holder means; in which the supply means for the dental handpieces and syringe extends through the supply and regulation compartment and through the instrument holder means and is operably connected from said instrument holder means to each of the dental handpieces and syringe; and in which the regulation means is partially in the supply and regulation compartment of the tray means and partially in the instrument holder means operably connected to the supply means in each of said compartment and holder means for regulating the flow of fluids to each of the dental handpieces and syringe.

6. Dental instrument unit construction as defined in claim 1 in which the dental instrument unit construction is of the type in which remote foot control means is operably connected to the dental instruments for selective manipulation by the dentist to selectively operate at least certain of the dental instruments in the performance of dental work; the additional improvements including the instrument holder means being supported on the tray means extending generally horizontally from said tray means, at least two fluid-driven dental handpieces removably positioned on the instrument holder means, the supply means comprising at least a common driving fluid supply and a common coolant fluid supply operably connected to the foot control means through the supply and regulation compartment of the tray means and into the instrument holder means for selective control of said common driving and coolant fluid supplies by said foot control means, selector valve means in the instrument holder means operably connected to the common driving and coolant fluid supplies and operably connected to the two dental handpieces selectively movable to one position for directing the common driving and coolant fluid supplies to one of the dental handpieces and to another position directing the common driving and coolant fluid supplies to the other handpiece, whereby the operation of the selected handpiece is remotely controlled by the foot control means.

7. Dental instrument unit construction as defined in claim 1 in which the dental instrument unit construction is of the type in which remote foot control means is operably connected to the dental instruments for selective manipulation by the dentist to selectively operate at least certain of the dental instruments in the performance of dental work; the additional improvements including the instrument holder means being supported on the tray means extending generally horizontally from said tray means, at least two fluid-driven dental handpieces removably positioned on the instrument holder means, the supply means comprising at least a common driving fluid supply and a common coolant fluid supply operably connected to the foot control means and through the supply and regulation compartment of the tray means and into the instrument holder means for selective control of said common driving and coolant fluid supplies by said foot control means, selector valve means in the instrument holder means operably connected to the common driving and coolant fluid supplies and operably connected to the two dental handpieces selectively movable to one position for directing the common driving and coolant fluid supplies to one of the dental handpieces and to another position directing the common driving and coolant fluid supplies to the other handpiece, whereby the operation of the selected handpiece is remotely controlled by the foot control means; in which the tray is freely removably positioned on the tray means; in which a second tray is positioned overlying the supply and regulation compartment and underlying the supporting said removable tray; and in which the second tray is selectively removably secured to the tray means forming a cover over the supply and regulation compartment; in which a dental syringe is also removably positioned on the instrument holder means; in which the supply means for the dental syringe extends through the supply and regulation compartment of the tray means and through the instrument holder means and is operably connected to the dental syringe at said instrument holder means.

8. Dental instrument unit construction as defined in claim 1 in which the dental instrument unit construction is of the type in which remote foot control means is operably connected to the dental instruments for selective manipulation by the dentist to selectively operate at least certain of the dental instruments in the performance of dental work; the additional improvements including the instrument holder means being supported on the tray means, the supply means comprising at least a common driving fluid supply and a common coolant fluid supply operably connected to the foot control means through the supply and regulation compartment of the tray means and to the instrument holder means for selective control of said common driving and coolant fluid supply means by said foot control means, whereby the operation of the handpiece is remotely controlled by the foot control means.

9. Dental instrument unit construction of the type in which tray means is mounted through a pivotal tray arm on a unit base for selected pivotal movement of the tray arm relative to the unit base and thereby movement of the tray means to selected horizontal and vertical locations, and in which dental instruments are operably and selectively removably connected to the unit for selective removal and use by the dentist in performing dental work on a patient positioned adjacent the unit base; the improvements which include a tray positioned on the tray means extending generally horizontally, wall members formed on the tray means positioned underlying and supporting the tray and forming a hollow compartment underlying said tray, a hollow instrument holder case, means mounting the instrument case support totally on and movable directly with the tray means and forming a communication between the tray means compartment and the interior of the instrument case, and at least one dental instrument holder formed on the instrument case.

10. Dental instrument unit construction as defined in claim 9 in which the means mounting the instrument case on the tray means is a tubular mounting arm opening into the tray means compartment and the instrument holder case interior; and in which two dental instrument holders and a dental syringe holder are formed on the instrument holder case.

References Cited
UNITED STATES PATENTS

| | | | |
|---|---|---|---|
| 3,094,780 | 6/1963 | Maurer et al. | 32—28 |
| 3,160,379 | 12/1964 | Gardella | 32—22 X |
| 3,210,846 | 10/1965 | Balkin | 32—22 |

FOREIGN PATENTS 909,003  10/1962  Great Britain.

RICHARD A. GAUDET, *Primary Examiner.*

R. E. MORGAN, *Examiner.*